Patented Sept. 23, 1952

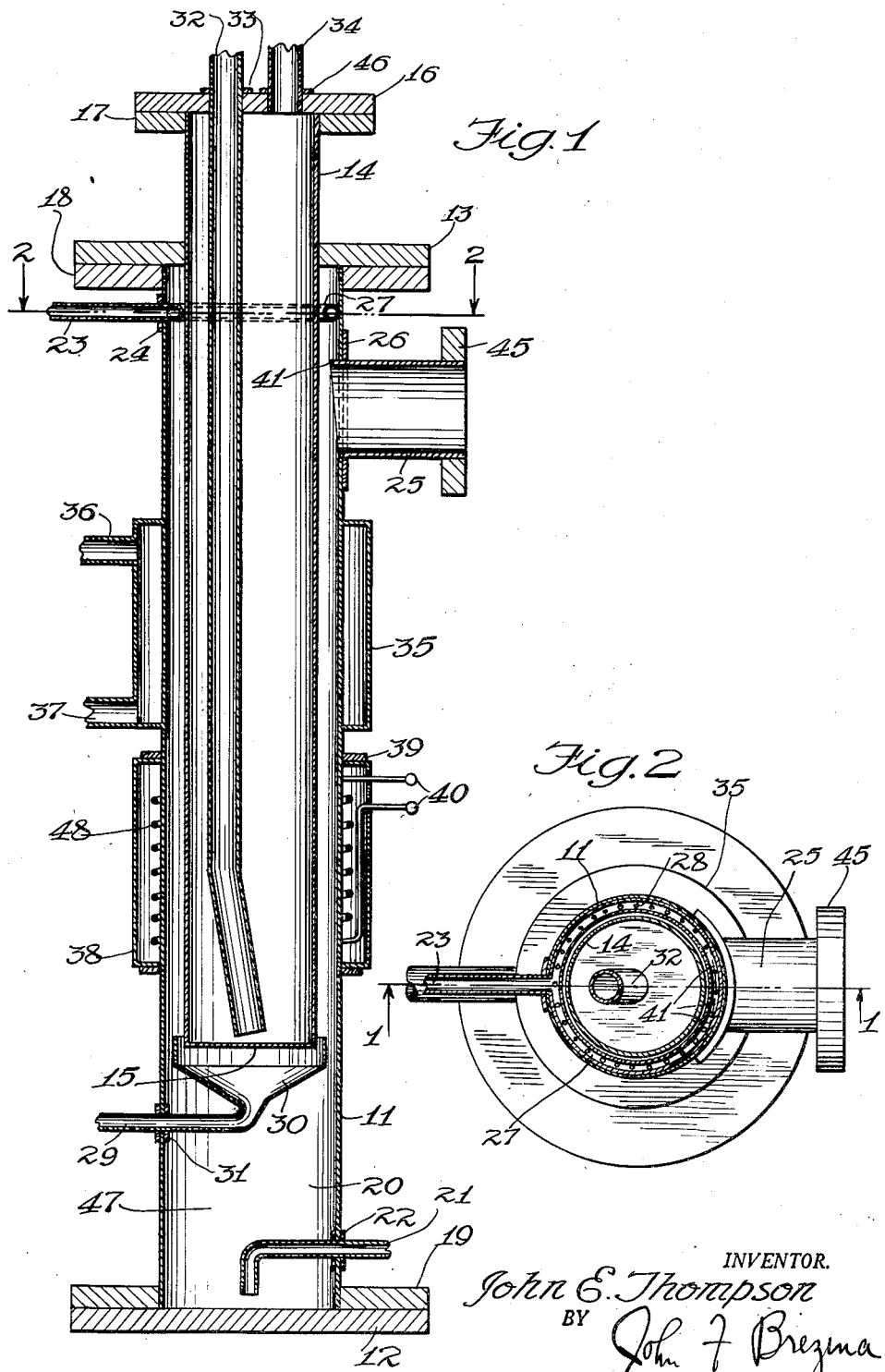

2,611,741

UNITED STATES PATENT OFFICE 2,611,741

DISTILLATION APPARATUS FOR REFINING FATS AND OILS

John E. Thompson, Chicago, Ill.

Application November 26, 1948, Serial No. 62,077

3 Claims. (Cl. 202—187)

My new and novel invention relates generally to the art of refining oils and fatty material and more particularly to the improved process of and apparatus for deodorization of animal oils and vegetable oils, such as cotton seed oil, corn oil, coconut oil, lard, tallow, and the like. The deodorization of these materials is generally for the purpose of producing certain edible products and comparatively odor-free materials for incorporation in pharmaceuticals, toiletries, and the like, although not necessarily limited thereto, by the removal, from the raw, oil of dissolved air and other undesirable volatile substances that would otherwise adversely affect the product with respect to color, odor, and taste, or cause rapid deterioration of the product.

Heretofore, the generally accepted method of deodorizing such oils has been accomplished by the use of (1) the batch system, in which the tank is filled with a charge of cold, raw oil which is thereupon subjected to the desired operating vacuum. It is then heated by means of heating coils within the tank, while at the same time stripping steam is forced through the body of oil, or (2) the continuous system, in which a similar effect is wrought on a continuous basis, using stripping steam forced through heated oil.

By the batch method, the temperature is gradually built up to the maximum in the presence of vacuum, and subsequently, some of the volatile constituents, including air, are released and escape from the oil before it reaches its maximum temperature. This is an advantage to the extent that the oil is not highly heated in the presence of oxygen and thus tends to prevent oxidation. However, heating the oil in bulk is a relatively slow process and has the disadvantage that certain other chemical changes may take place as a result of the extended heating period.

Moreover, only the top-most part of the oil is subjected to full vacuum since all other portions of the body of oil are under some hydrostatic pressure. The deodorization period by this process is undesirably extended with the adverse results referred to.

Various attempts have been made to make use of a continuous system of deodorization by heating the raw oil and then exposing it in relatively shallow layers of large area to sub-atmospheric pressure, while, at the same time contacting the oils with stripping steam with the thought that complete deodorization might thus be brought about in a much shorter period of time than would be the case with a batch system, thereby minimizing the deleterious chemical actions produced by subjecting the body of the oil to a prolonged high temperature heating. A major impediment to the success of such continuous systems has been the lack of provision for the initial release of air and certain undesirable volatile constituents at low temperature; or the use of highly complicated systems attempting to remove the air and certain undesirable volatile constituents, the use of which introduced additional adverse results.

An additional disadvantage to existing systems of deodorization employing steam to strip undesirable volatiles from the raw oil arises out of the extremely costly and bulky equipment necessary to maintain high vacuum, while disposing of the large volume of stripping steam used in these methods.

The major objects of my present novel invention overcome the aforementioned disadvantage of prior products by causing the raw oil, which is to be deodorized, to pass continually over surfaces heated to successively higher temperatures to remove a portion of the vapors, and especially the air, before the oil reaches the high temperature necessary to complete deodorization. The oil passing over these heated surfaces is exposed to high vacuum in the form of an extremely thin film so that stripping steam is unnecessary to accomplish release of the undesirable volatile materials. With this method, steam consumption and operating costs and initial capital investment are reduced as compared with prior methods, and physical size of the apparatus is greatly reduced.

Other and further objects of my novel device will become apparent from the specification and the appended claims, reference being made to the drawings and the numerals of reference thereon.

On the drawings:

Fig. 1 is a diagrammatic longitudinal cross sectional view of my device.

Fig. 2 is a cross sectional view taken substantially on the line 2—2 of Fig. 1 and looking in the direction of the arrows.

Referring to the drawings, numeral 11 represents an elongated apertured tube or tubular member which is sealed at one end, which in a preferable form is the top, in any suitable manner such as by means including an apertured weld flange, plate, disk or member such as I have illustrated as numeral 13 and which is preferably welded to an end periphery of tube 11. The tube 11 is preferably composed of some non-corrosive material such as stainless steel or the like. At the other end, which is preferably the bottom, tube 11 is sealed by a weld flange, disk or plate 12 by means such as welding.

Numeral 14 represents an elongated tubular member, pipe or hollow column which is closed at one end by a preferably integral end portion or plate 15, which is integral with the longitudinal walls of the tube 14. The tube 14, at a preferably upper end thereof, is sealed by an apertured weld flange, plate or disk 16, which in a preferred form is adapted to form an air tight seal around the periphery of the upper end of the tube 14 by means such as welding. Portions of the column 14 are disposed within the tube 11 and a mounting of said tube 14 is provided by preferably welding portions of its outer wall to the aperture defining edges of the flange 13, as illustrated in Fig. 1.

Securely mounted, by welding or the like, around the tube 11 at one end thereof is an apertured flanged member 19 whose flanges on a preferably lower surface are welded or equivalently united to the preferably upper abutting face of flange 12. Similarly a weld flange 18 is securely mounted on the other end of tube 11, as illustrated, and the face thereof abutting disk 13 is preferably welded thereto. In preferably a like manner flange member 17 is welded to disk or sealing plate 16. The members or weld flanges 17, 18 and 19 respectively, in the modified form illustrated add rigidity to the plates or disks 16, 13 and 12 respectively and may be utilized in the mounting of my novel device, in any suitable manner.

The tube 14 is rigidly and removably mounted in the aperture of the plate 13, by welding or any suitable equivalent which unites portions of the surface thereof to the aperture limiting edges of flange 13. The mounting of tube 14 is of a nature which is substantially air tight, and one which will not permit the entrance or exit of any fluid material therethrough. Preferably the major portion of the length of the tube 14 is disposed within the tube 11 in a manner such as I have illustrated in Fig. 1.

The outer surface of the tube 14 which is disposed within the tube 11 provides a surface on which condensable gases will liquefy. The chamber 20 which is formed between the walls of the tube 11 and the walls of the tube 14, and which is limited on its opposite ends by the disks 13 and 12, provides a vacuum compartment. To facilitate the condensation of gases on the outer surface of the column 14, said column should be sufficiently large to be in close approximation to the inner surface of the tube 11, so that fluid molecules liberated will easily come in contact with said surface of column 14 and not re-enter the liquid film of fat. Preferably at the lower end thereof a pipe 21, which may be optionally L-shaped and disposed as I have illustrated in Fig. 1 is rigidly mounted in the pipe of tube 11 and is sealed air tight, by any suitable means such as welded sealing rings or their equivalent which I have numbered 22. The passage of the pipe, conduit or tube 21 is communicatively connected with the vacuum chamber, and preferably a vacuum pump or some other vacuum developing means (not shown) is communicatively connected with the pipe 21 so that any material collecting in the bottom of the chamber 20 will be drawn through said pipe into an appropriate collecting chamber or element (not shown).

Preferably near the upper end thereof, the tube 11 is apertured and a feeding means, conduit, pipe or tube 23 is rigidly mounted in said aperture. Sealing said pipe 23 to said tube 11 in an air tight seal in a sealing ring or suitable equivalent 24 which may be disposed along the outer surface of the tube 11 as illustrated in Fig. 1. Preferably at the upper end thereof, the pipe or tube 11 has another aperture in which is mounted a communicating conduit, pipe or nipple 25, which communicates with the chamber or vacuum compartment 20, and which is preferably sealed by means of a sealing ring or other suitable means 26 so that an air tight seal is formed between the communicating means 25 and the tube 11. The nipple 25 is communicatively connected to a vacuum pump or other withdrawal means (not shown) preferably by means of a weld flange 45. Rigidly disposed along the inner surface of tube 11, preferably substantially adjacent to the upper end thereof, is a hollow annular pipe or distributor 27 which is preferably disposed adjacent portions of the inner face of the walls of tube 11, and which has a plurality of preferably downwardly opening holes or apertures 28, said holes or apertures preferably being substantially uniformly spaced horizontally. The pipe 23 is communicatively connected with said distributor 27 as illustrated in Fig. 2.

The inner portion of the pipe 25 carries a preferably integral curved flange or lip 41 which is curved downwardly so that any material dropping on said flange will be deflected away and past the opening of the communicating means 25. Obviously such deflection may be accomplished in a variety of manners but I have found the above to be the simplest.

Another aperture in the wall of the tube 11 provides the means through which a communicating pipe 29 extends into the chamber 20. Said communicating pipe or tube 29 at the inner end thereof carries catch basin or apertured pan 30 to which said pipe 29 is communicatively connected. The pipe 29 is appropriately sealed to form an air tight seal with the tube 11 by means of suitable members such as sealing rings or the like 31 which are preferably welded to the conduit 29 and portions of tube 11. The basin 30 is positioned and rigidly mounted at preferably the lower end of pipe 14, said basin 30 being preferably of a diameter greater than said pipe 14 so that the adjacent end of the column or pipe 14 is disposed within the opening in said basin 30. A suitable exhaust means is communicatively connected to the pipe 29 to withdraw any materials collected in pan or basin 30.

Through one of the apertures in the flange or plate 16 a substantially narrow and elongated pipe or conduit 32 extends and terminates preferably adjacent the end portion 15 of the tube 14. Said pipe is sealed, in preferably an air tight seal, in said aperture by any suitable means such as an annular sealing ring which may be welded or equivalently united to portions of the conduit 32 and the weld flange 16, as illustrated in the upper portion of Fig. 1. Mounted in another aperture of the disk 16 is a communicating pipe or conduit 34 which is adapted to conduct away from the space formed within the pipe 14 any volatile material. To form a preferably air tight seal, a suitable sealing ring 46 may be employed, said ring preferably being welded to the flange 16 and the conduit 34.

Rigidly mounted and around portions of the outer surface of tube 11 is a preferably annular trough-shaped jacket or channel 35 which is connected along the inner edges thereof to the tube 11 by a means such as welding to form a complete and air tight seal between the inner edges of the annular jacket and the outer surface portions of the tube 11. It should be understood that any suitable and equivalent means of mounting the steam jacket 35 or for providing equivalent heat may optionally be used. Communicatively connected with said jacket are a pair of pipes or conduits 36 and 37 one of which is an inlet pipe and the other of which is an outlet pipe. Preferably an annular jacket 38 is rigidly mounted around the tube 11 by any suitable means such as by retaining members 39. The jacket 38 is spaced from the jacket 35 preferably being positioned below said last mentioned jacket. Mounted in said jacket are a plurality of highly electrical resistant wires or heater elements the terminals of which are electrically connected to a suitable source of power designated as 40, for example, an electric generator (not shown).

The following is a brief description of the operation of my novel device, and it is to be understood that although variations in the structural elements may occur, the concept herein embraced relates to many modifications not specifically herein described.

The fatty material being preferably in liquid form is forced into distributor 27 through the conduit 23. At the time of entry into the distributor, the fatty material is drawn downward by means of gravity. The apertures 28 in the distributor 27 are positioned adjacent the inner wall of the tube 11. As the fat then is drawn down by gravity, or equivalently forced from said distributor, it forms a film along the inner wall of tube 11, said film of fatty material being preferably drawn downward by gravity. As the film of the fatty material advances along the inner wall of pipe 11 it is deflected away from the opening where the pipe or nipple 25 communicates with the chamber 30 by means of the flange or lip 41 which directs the flow of material around the aperture in which said conduit 25 is positioned.

Preferably steam is supplied from an outside source going into the jacket 35 through the pipe 36 the condensate leaving through pipe 37 which pipe is connected to a suitable exhaust pump (not shown). As the film of moving fatty material comes into contact with the portions of the jacket heated by virtue of the steam which is passing through the jacket 35, it becomes subjected to gradually rising temperatures which preferably, at the highest temperature, substantially approximates the temperature of the steam supply. During this initial heating certain volatile adulterants of the fatty material are liberated because of that heat. As the film continues to advance it comes into contact with portions of the tube 11 which are heated because of the electric heater unit 38 and there less easily liberated adulterants are liberated. The gradient of temperature which is established by this novel device provides for the film of fat coming into contact with an increasingly higher temperature as it is preferably gravity drawn along the inner wall of the tube 11. Thus volatile fluids, which would cause objectionable substances to be produced in the fat if driven off at a high temperature, are driven from the advancing and moving fat film at a relatively low temperature. In this novel device dissolved air, non-condensable gases, and more volatile products are driven from the film of fatty material as it passes the steam jacket portion of the column or tube 11. The air and non-condensable fluids pass upward through the preferably annular space 20 and they are drawn out of the vacuum chamber 20 through communicating pipe or nipple 25.

A coolant or refrigerant is circulated through the column or pipe 14 by being introduced through pipe 32 preferably into the bottom of the pipe or container 14. A suitable coolant or refrigerant which has thus been admitted into the chamber formed within the pipe 14 is liberated at the opposite end of pipe 32 and circulated in said column thereby causing a cooling of the walls of the pipe 14. As said coolant or refrigerant is heated it is removed from the chamber formed within pipe 14 out of the apparatus through communicating pipe 34.

The outer surface of the pipe 14 disposed within the tube 11 forms a condensing surface, and condensable gases which are liberated from the film of advancing adulterated fatty and contaminated material, are condensed on the outer surface of the pipe or column 14. It is preferable to have the outer surface of column 14 relatively near the inner surface of pipe 11 for reasons heretofore indicated. Said condensable gases are carried along the surface of column 14 by means of gravity, preferably, and drop into the basin or pan or collecting element 30 and are withdrawn from my novel apparatus and device through the communicating conduit or pipe 29.

As the film of fat advances, the impurities being discharged as described, it moves to the bottom of the column or tube 11 and collects in one end of the tube 11, which provides a reservoir, against the plate or disk 12, the fat is drawn from the device as a purified material, through the outlet pipe 22.

In the modified form which I have described I have illustrated an apparatus which is adapted to liberate objectionable material from the fat continuously. However, this method may easily be adapted for use in the batch-wise method of purifying fats or fatty materials.

In one modified form adapted for treating adulterated fatty materials batch-wise, the lower or end portions of the vacuum chamber 20 may be enlarged at the region indicated as 47 so that said enlarged portions will hold substantially the amount of a single batch. Fatty material is then introduced through the pipe 23 and distributed along the inner walls of pipe 11 through distributor 27, collecting in the enlarged portion 47. During this introductory process no heat is supplied through the heater 38. In this modified form the use of heat furnished through steam jacket 35 may be dispensed with entirely.

The fat which has collected in the enlarged portion at 47, is then circulated and pumped back to pipe 23 at a preferably uniform rate. During the re-circulation process, heat equivalent to that produced by the steam jacket 35 may be applied to the re-circulated fat before the same is reintroduced into the distributor 27.

In this modified form the electrically resistant coils 48 which form the heating elements are disposed along the outer surface of the tube 11 to establish a heat gradient. Thusly fat which is now free of the easily removed volatilates is distributed along the inner surface of the pipe 11 and is exposed and subjected to a relatively high heat gradient which will cause the driving off of the volatilates not driven off during the re-circulation of the fat from the tube 11 to the pipe 23.

It should be understood that although the volatilates which are removed from the finished fat are referred to as obnoxious adulterants and impurities, that these are only impurities and adulterants in the sense that they are undesirable in the finished fat product.

It is an embodiment of this invention to provide a means so that some of these "impurities" or "adulterants" may be easily recovered inasmuch as the volatilates, which although undesirable in the finished fat product, contain valuable materials, generally fatty acids, which ordinarily sell for a higher price than the finished fat.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a device for the continuous removal of volatile elements from fats and the like, an outer housing providing the outermost wall of a vacuum chamber and providing an inner surface along which fats will flow downwardly; pipe means extending through said housing for introducing the unfinished fat into upper portions of said vacuum chamber; a circular conduit having a plurality of holes and being connected to said pipe means for distributing said fat over the upper inner surface of said outer housing; a steam heater disposed around said vacuum chamber and being adapted to heat portions thereof to the approximate temperature of said heater means; an electrical heater disposed around portions of said vacuum chamber below said primary heater and being adapted to heat portions thereof to substantially the temperature of said second heater means, said primary heater being adapted to heat the vacuum chamber to temperatures which are lower than the temperatures of said second heater; a condenser tube mounted in said vacuum chamber and extending outwardly therefrom and providing a surface on which volatilized fluids may condense; the heat from said second heater being adapted to drive impure fluids from the fat not driven off by the heat produced by said primary heater; an exhaust nipple adapted to withdraw from said vacuum chamber all non-condensable fluids, the condensable fluid impurities being condensable along said condensing surface; a lip in the path of fat flow for precluding entrance of fat into said nipple; a fluid collection means adapted to collect the condensed fluid impurities and conduct them out of said vacuum chamber and extending through said wall; a reservoir in said vacuum chamber into which the finished fat may be collected; and conduit means connected with said reservoir for removing the finished fat and extending through said wall.

2. In a device for removing impurities from edible fats and the like, an outermost elongated vertically disposed side apertured tube housing having sealing elements secured on its opposite ends, the upper of said sealing elements being apertured; an upper steam heating element mounted in heat exchange relation with an intermediate portion of said tube housing; a lower electrically energized heating element in heat exchange relation with a portion of the walls of said tube housing and being disposed below said steam heating element; an elongated vertically disposed condenser tube mounted concentrically within the chamber of said tube housing; conduits extending outwardly from the upper end of said condenser tube and adapted to conduct and circulate a flowable cooling medium through said condenser tube; an inlet conduit having one end portion mounted in the upper end of said tube housing; an annular apertured conduit communicatively connected to said inlet conduit and adapted to distribute impure fatty substances through the space between said condenser tube and said tube housing and along the inner annular face of said tube housing; an exhaust outlet fitting having an inwardly extending curved baffle flange mounted in the said aperture of said tube housing, said flange being adapted to divert downwardly flowing fatty material from the aperture of said fitting; a basin of greater diameter than the diameter of said condenser tube and being below the lower end of said condenser tube and having an outlet pipe extending through the wall of said tube housing, whereby condensed impurities may be discharged, said tube housing providing a reservoir below said funnel member for the collection of purified fats from the inner wall of said tube housing and a conduit extending from said reservoir through said tube housing and for exhausting the purified fats from said reservoir, the fat introduced by said inlet conduit being adapted to gradually descend and flow downwardly along the inner face of said tube housing, and said heating elements being adapted to vaporize the impurities of said fat of the introduced fat, said condenser tube being adapted to condense a portion of the impurities, the remainder of said impurities being exhausted through said fitting.

3. In a device for the continuous removal of volatile impurities from fats and the like, an outermost closed ended evaporating tube providing a vacuum chamber in which fat will move along a given course; a conduit extending through the upper portion of said tube for introducing the unfinished fat into the upper end of said vacuum chamber; an apertured annular distributor connected to said fat conduit for distributing said fat over the upper inner surface of said vacuum chamber; a steam heater disposed around said vacuum chamber and being adapted to heat portions thereof to the approximate temperature of said steam heater; a second heater disposed around portions of said vacuum chamber and spaced below said steam heater and being adapted to heat portions thereof to substantially the temperature of said second heater; said steam heater being adapted to heat the vacuum chamber to temperatures which are lower than the temperatures of said second heater; a condenser pipe in said vacuum chamber providing a surface on which fluids may condense; the heat from said second heater being adapted to drive off impure fluids not driven off by the heat produced by said primary steam heater; an exhaust nipple having a curved flanged end portion extending through said evaporating tube and adapted to withdraw from said vacuum chamber all non-condensable fluids, the condensable fluids being condensable along said condensing surface; said nipple being disposed on the inner wall of said tube and adapted to keep fats from being withdrawn through said nipple; a fluid collection means adapted to collect the condensed fluids from said condensing surface and conduct them out of said vacuum chamber; a reservoir in the bottom part of said vacuum chamber adapted to collect the finished fats, and conduit means connected with said reservoir for continuously removing the finished fats.

JOHN E. THOMPSON.

REFERENCES CITED

The following references are of record in the file of this patent:

UNITED STATES PATENTS

| Number | Name | Date |
|---|---|---|
| 1,332,908 | Lloyd | Mar. 9, 1920 |
| 1,885,402 | Angelucci | Nov. 1, 1932 |
| 2,224,621 | Voorhees | Dec. 10, 1940 |
| 2,357,829 | Ittner | Sept. 12, 1944 |
| 2,403,978 | Hickman et al. | July 16, 1946 |
| 2,486,684 | Schlesman et al. | Nov. 1, 1949 |

FOREIGN PATENTS

| Number | Country | Date |
|---|---|---|
| 487,697 | Great Britain | June 24, 1938 |